US011784797B2

(12) United States Patent
Arkko et al.

(10) Patent No.: US 11,784,797 B2
(45) Date of Patent: Oct. 10, 2023

(54) SERVING-NETWORK BASED PERFECT FORWARD SECURITY FOR AUTHENTICATION

(71) Applicant: Telefonaktiebolaget LM Ericsson (publ), Stockholm (SE)

(72) Inventors: Jari Arkko, Kauniainen (FI); Vesa Torvinen, Sauvo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 39 days.

(21) Appl. No.: 16/766,253

(22) PCT Filed: Oct. 19, 2018

(86) PCT No.: PCT/IB2018/058175
§ 371 (c)(1),
(2) Date: May 21, 2020

(87) PCT Pub. No.: WO2019/106451
PCT Pub. Date: Jun. 6, 2019

(65) Prior Publication Data
US 2021/0036842 A1    Feb. 4, 2021

Related U.S. Application Data

(60) Provisional application No. 62/592,889, filed on Nov. 30, 2017.

(51) Int. Cl.
*H04L 9/08* (2006.01)
*H04L 9/14* (2006.01)
*H04L 9/32* (2006.01)

(52) U.S. Cl.
CPC .......... *H04L 9/0819* (2013.01); *H04L 9/0841* (2013.01); *H04L 9/0861* (2013.01); *H04L 9/14* (2013.01); *H04L 9/32* (2013.01)

(58) Field of Classification Search
CPC ... H04L 9/0819; H04L 9/0841; H04L 9/0861; H04L 9/14; H04L 9/32
See application file for complete search history.

(56) References Cited

U.S. PATENT DOCUMENTS 9,584,318 B1 *   2/2017   Yang ..................... H04L 63/101
9,893,883 B1 *   2/2018   Chaubey ............... H04L 63/061
(Continued)

FOREIGN PATENT DOCUMENTS

WO    2016/160256 A1    10/2016

OTHER PUBLICATIONS

Lai et al., SE-AKA: A secure and efficient group authentication and key agreement protocol for LTE networks, Jan. 2013, Computer Networks, 57(17), 3492-3510 (Year: 2013).*
(Continued)

*Primary Examiner* — Noura Zoubair
*Assistant Examiner* — Zoha Piyadehghibi Tafaghodi
(74) *Attorney, Agent, or Firm* — Christopher & Weisberg, P.A.

(57) ABSTRACT

A method for a serving network to selectively employ perfect forward security (PFS) based on an indication from a home network is described. The method includes receiving, by the serving network, a PFS indicator from the home network; determining, by the serving network, whether the PFS indicator indicates that the home network has instructed the serving network to employ PFS for communications with a piece of user equipment; and performing, by the serving network, a PFS procedure with the piece of user equipment in response to determining that the PFS indicator indicates that the home network has instructed the serving network to employ PFS for communications with the piece of user equipment.

13 Claims, 7 Drawing Sheets

(56) References Cited

U.S. PATENT DOCUMENTS

| | | | |
|---|---|---|---|
| 2013/0243194 A1* | 9/2013 | Hawkes | H04W 12/041 380/270 |
| 2016/0127903 A1* | 5/2016 | Lee | H04W 36/0038 713/168 |
| 2016/0226847 A1* | 8/2016 | Bone | H04W 8/04 |
| 2016/0255070 A1 | 9/2016 | Naslund et al. | |
| 2017/0006469 A1* | 1/2017 | Palanigounder | H04L 9/0891 |
| 2017/0019251 A1* | 1/2017 | Jain | H04L 9/12 |
| 2017/0272944 A1* | 9/2017 | Link, II | H04L 9/0841 |
| 2017/0372061 A1* | 12/2017 | Penzin | G06F 9/45558 |

OTHER PUBLICATIONS

3GPP TS 23.501 v100: 3rd Generation Partnership Project; Technical Specification Group Services and System Aspects; System Architecture for the 5G System; Stage 2 (Release 15), Jun. 2017, pp. 1-146.

3GPP TS 23.502 v040: 3rd Generation Partnership Project; Technical Specification Group Services and System Aspects; Procedures for the 5G System; Stage 2 (Release 15), Apr. 2017, pp. 1-124.

Arkko J et al., "A USIM Compatible 5G AKA Protocol with Perfect Forward Secrecy", Aug. 21, 2015, 2015 IEEE Trustcom/BigDataSE/ISPA, pp. 1205-1209.

Arkko J et al., "Improved Extensible Authentication Protocol Method for 3rd Generation Authentication and Key Agreement (EAP-AKA')", RFC 5448, May 2009, pp. 1-30, http://tools.ietf.org/html/rfc5448.

Arkko J et al., "Perfect-Forward Secrecy for the Extensible Authentication Protocol Method for Authentication and Key Agreement (EAP-AKA' PFS)", draft-arkko-eap-aka-pfs-00, Oct. 30, 2017, pp. 1-21, https://tools.ietf.org/html/draft-arkko-eap-aka-pfs-00.

Huawei et al., "Enforcement of Session Key with DH Procedure in Serving Networks", 3GPP SA WG3 contribution S3-173156, Nov. 2017, pp. 1-4, http://www.3gpp.org/ftp/TSG_SA/WG3_Security/TSGS3_89_Reno/Docs/S3-173156.zip.

Mun H et al., "3G-WLAN Interworking: Security Analysis and New Authentication and Key Agreement based on EAP-AKA", Apr. 21, 2009, Wireless Telecommunications Symposium 2009, IEEE, pp. 1-8.

Vodafone, "pCR to 33.501—DH procedure with AMF for protection against passive eavesdropping", 3GPP SA WG3 contribution S3-173262, Nov. 2017, pp. 1-5, http://www.3gpp.org/ftp/TSG_SA/WG3_Security/TSGS3_89_Reno/Docs/S3-173262.zip.

Wikipedia, "Extensible Authentication Protocol", Available online at <https://en.wikipedia.org/wiki/Extensible_Authentication_Protocol>, Nov. 25, 2017, 10 pages.

Wikipedia, "Forward Secrecy", Available online at <https://en.wikipedia.org/wiki/Forward_secrecy>, Nov. 23, 2017, 5 pages.

* cited by examiner

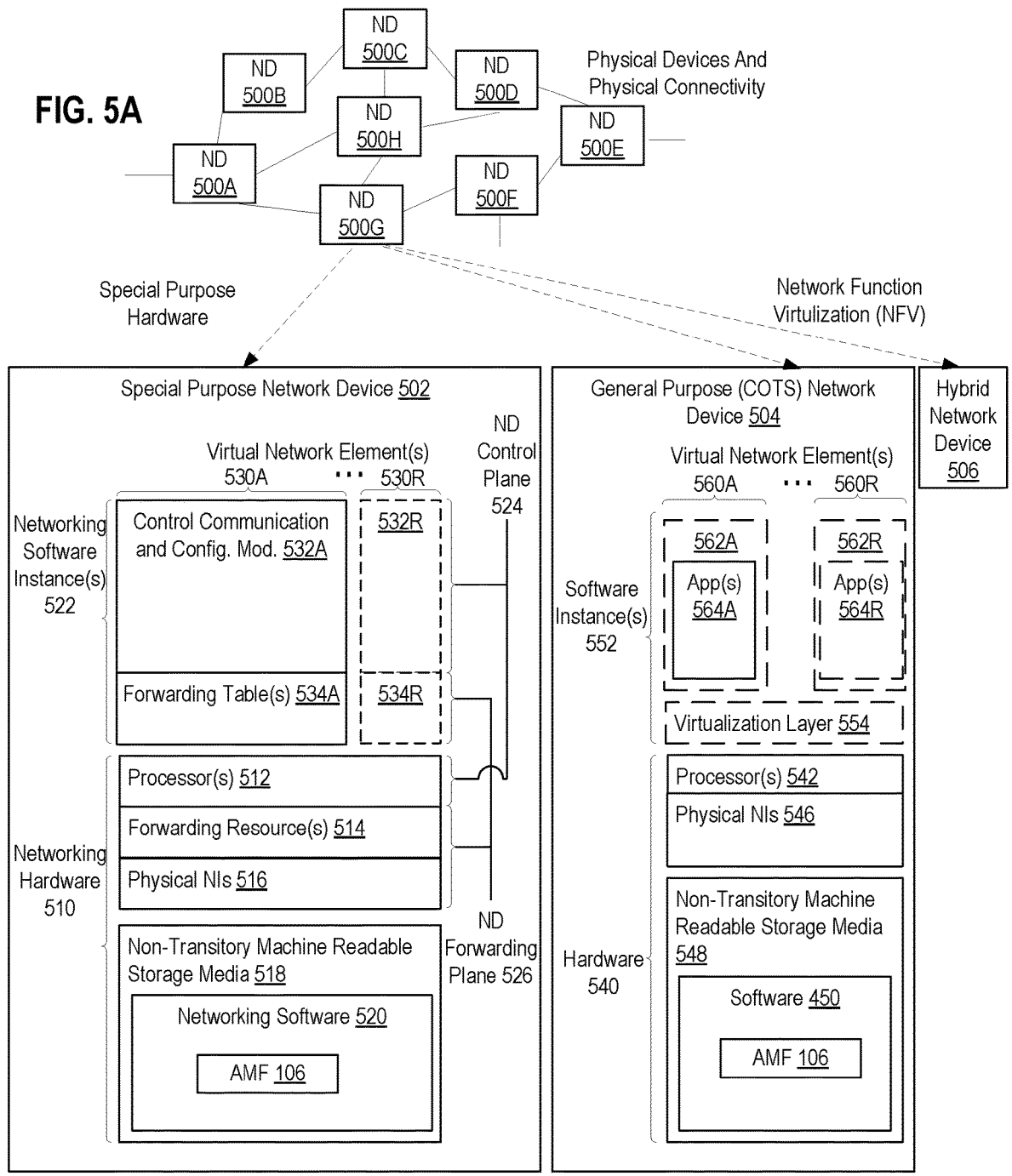
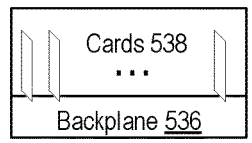

Ll
SERVING-NETWORK BASED PERFECT FORWARD SECURITY FOR AUTHENTICATION

CROSS-REFERENCE TO RELATED APPLICATIONS

This application is a National stage of International Application No. PCT/IB2018/058175, filed Oct. 19, 2018, which claims priority to U.S. Provisional Application No. 62/592,889, filed Nov. 30, 2017, which are hereby incorporated by reference.

TECHNICAL FIELD

Embodiments of the invention relate to the field of wireless networks; and more specifically, to a serving network selectively employing perfect forward security (PFS) with user equipment based on an indication from a home network of the user equipment.

BACKGROUND ART

The 3rd Generation Partnership Project (3GPP) is investigating security procedures between user equipment and network components. One proposal includes offering perfect forward security during authentication of user equipment. Perfect forward security (PFS), sometimes referred to as forward security, is a property of secure communication protocols in which compromises of long-term keys do not compromise past session keys and which protects past sessions against future compromises of secret keys or passwords. Accordingly, if PFS is employed, encrypted communications and sessions recorded in the past cannot be retrieved and decrypted should long-term secret keys or passwords be compromised in the future, even if an adversary actively interfered.

One approach of using PFS employs a Diffie-Hellman procedure between the user equipment and a home network. The Diffie-Hellman process provides the PFS property for keys generated through this process. Another approach uses Diffie-Hellman between the user equipment and the serving network (sometimes referred to as the visiting network). In particular, a node in the serving network determines the capabilities of the user equipment from the home network and decides, based on these capabilities and preferences of the serving network, whether to run a Diffie-Hellman procedure alongside a general authentication process. If the Diffie-Hellman procedure is run, public keys are exchanged between the serving network and the user equipment such that the serving network and the user equipment can now both generate a secret key that is only known to the serving network and the user equipment. This secret key has the PFS property and can be used to derive further keys for protecting communications between the serving network and the user equipment (e.g., for ciphering/encrypting traffic to and from the user equipment).

However, by using the above technique, the home network has no effect on the decision to use PFS (e.g., whether or not to use the Diffie-Hellman procedure) and instead only capabilities and preferences of the user equipment and the serving network are taken into consideration. Further, the home network is no longer aware of the session keys used by the user equipment, which can be problematic in certain situations (e.g., in some Legal Interception (LI) situations). Additionally, as a side-effect of the above process, the home network derives session keys for communications with the user equipment using standard authentication/security procedures, but the serving network and the user equipment now share a secret key that has objectively better qualities (i.e., the PFS property) in comparison to standard authentication/security procedures. Moreover, the user equipment only obtains one root key from the Diffie-Hellman procedure and can only use that root key for communication with the serving network.

SUMMARY

A method for a serving network to selectively employ perfect forward security (PFS) based on an indication from a home network is described. The method includes receiving, by the serving network, a PFS indicator from the home network and determining, by the serving network, whether the PFS indicator indicates that the home network has instructed the serving network to employ PFS for communications with a piece of user equipment. Thereafter, the serving network performs a PFS procedure with the piece of user equipment in response to determining that the PFS indicator indicates that the home network has instructed the serving network to employ PFS for communications with the piece of user equipment.

A network device to function as a switch in a serving software-defined networking (SDN) network to selectively employ perfect forward security (PFS) based on an indication from a home network is described. The network device includes a set of one or more processors and a non-transitory machine-readable storage medium having stored therein an access and mobility management function, which when executed by the set of one or more processors, causes the switch to receive a PFS indicator from the home network and determine whether the PFS indicator indicates that the home network has instructed the serving network to employ PFS for communications with a piece of user equipment. Thereafter, a PFS procedure is performed with the piece of user equipment in response to determining that the PFS indicator indicates that the home network has instructed the serving network to employ PFS for communications with the piece of user equipment.

A non-transitory machine-readable medium having computer code stored therein, which when executed by a set of one or more processors of a network device functioning as a switch in a serving software-defined networking (SDN) network, causes the switch to selectively employ perfect forward security (PFS) based on an indication from a home network is described. The operations include receiving a PFS indicator from the home network and determining whether the PFS indicator indicates that the home network has instructed the serving network to employ PFS for communications with a piece of user equipment. Thereafter, a PFS procedure is performed with the piece of user equipment in response to determining that the PFS indicator indicates that the home network has instructed the serving network to employ PFS for communications with the piece of user equipment.

As described above and as will be described in greater detail below, the decision on whether PFS is to be employed is made by the home network, while the performance of procedures to accomplish PFS (e.g., performance of a Diffie-Hellman key exchange procedure) is made by the serving network in conjunction with the user equipment. In this fashion, (1) the home network can now control whether PFS is employed between the serving network and the user equipment, such as through performance of a Diffie-Hellman procedure even though the Diffie-Hellman procedure is run by the serving network; (2) the home network can now be informed of secret keys produced in the serving network as a result of the Diffie-Hellman key exchange procedure; (3) the home network and the serving network can be given separate sets of keys for the protection of their communications with the user equipment; and (4) the user equipment can have access to separate sets of keys for communicating with the serving network and the home network and both sets of keys can be based on the Diffie-Hellman procedure that produces secret keys with the PFS property.

BRIEF DESCRIPTION OF THE DRAWINGS

The invention may best be understood by referring to the following description and accompanying drawings that are used to illustrate embodiments of the invention. In the drawings:

FIG. 5A illustrates connectivity between network devices (NDs) within an exemplary network, as well as three exemplary implementations of the NDs, according to some embodiments of the invention.

FIG. 5B illustrates an exemplary way to implement a special-purpose network device according to some embodiments of the invention.

DETAILED DESCRIPTION

The following description describes methods and apparatus for a serving network to selectively employ perfect forward security (PFS) (e.g., through performance of a Diffie-Hellman key exchange procedure) with user equipment based on an indication/preference from a home network of the user equipment. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
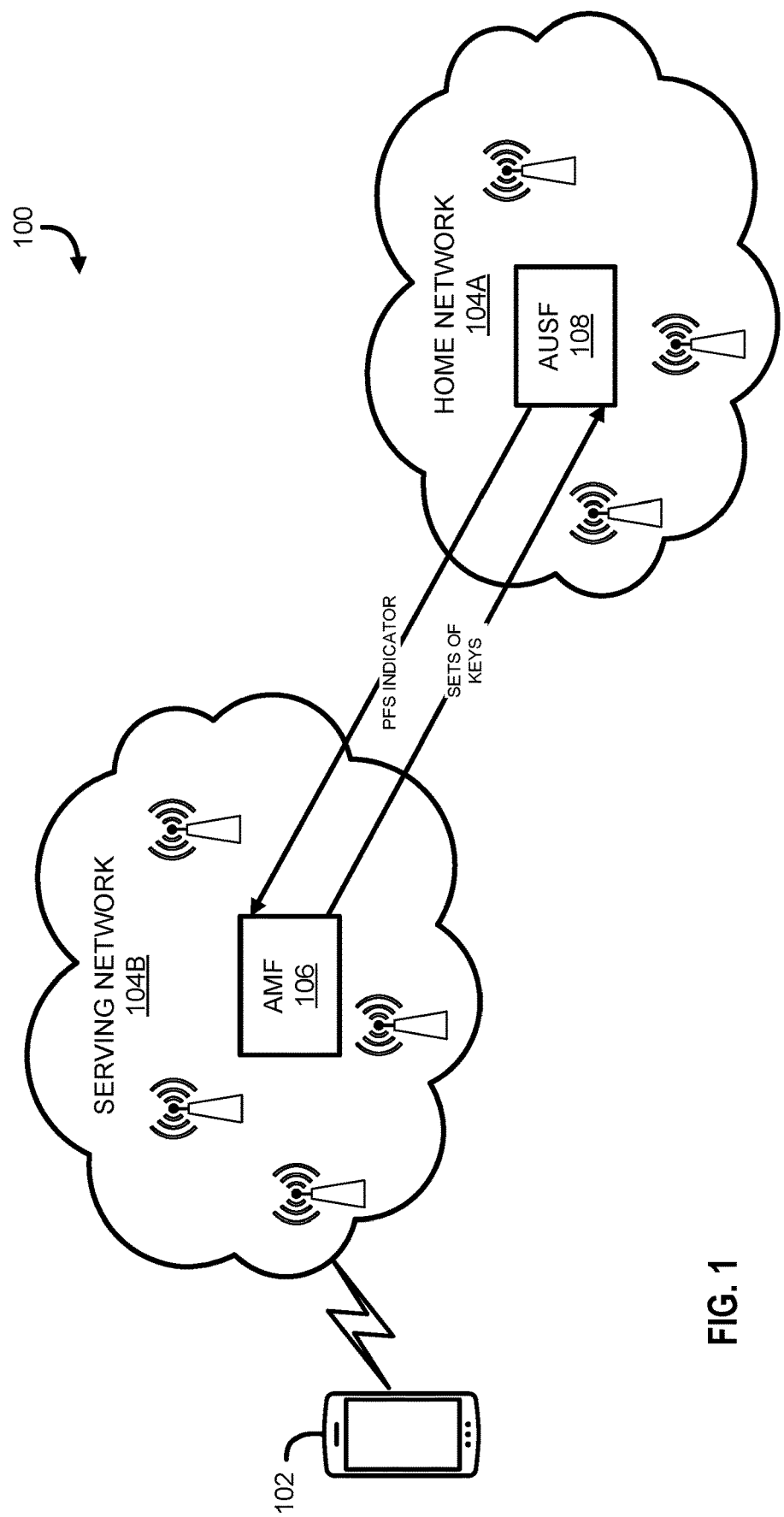
FIG. 1 illustrates a network system, including a piece of user equipment, a home network, and a serving network, according to one example embodiment.

FIG. 1 shows a network system 100, according to one example embodiment. As shown in FIG. 1, the network system 100 may include a piece of user equipment 102, a home network 104A, and a serving network 104B. As will be described in greater detail below, upon the user equipment 102 attempting to connect to the serving network 104B, the serving network 104B may transmit an authentication request to the home network 104A. The authentication request may explicitly or implicitly inquire the home network 104A as to whether perfect forward security (PFS) should be employed by the serving network 104B in relation to the user equipment 102 to generate a secret key. PFS, sometimes referred to as forward security, is a property of secure communication protocols in which compromises of long-term keys do not compromise past session keys and which protects past sessions against future compromises of secret keys or passwords. Accordingly, if PFS is employed, encrypted communications and sessions recorded in the past cannot be retrieved and decrypted should long-term secret keys or passwords be compromised in the future, even if an adversary actively interfered.

In an example embodiment, a Diffie-Hellman key exchange procedure may be selectively performed by the serving network 104B and the user equipment 102 to generate a secret key based on a PFS indication from the home network 104A. Using the Diffie-Hellman key exchange procedure, the generated secret key is known by both the user equipment 102 and the serving network 104B such that one or more sets of additional keys may be generated by the user equipment 102 and the serving network 104B based on the secret key and one or more additional inputs. The serving network 104B may thereafter (1) use the sets of keys for communications with the user equipment 102 and (2) distribute all or a subset of the sets of keys to the home network 104A such that the home network 104A can use one or more of keys for communications with the user equipment 102.

Accordingly, as described above and as will be described in greater detail below, the decision on whether PFS is to be employed is made by the home network 104A, while the performance of procedures to accomplish PFS (e.g., performance of a Diffie-Hellman key exchange procedure and derivation of additional keys) is made by the serving network 104B in conjunction with the user equipment 102. In this fashion, (1) the home network 104A can now control whether PFS is employed between the serving network 104B and the user equipment 102, such as through performance of a Diffie-Hellman procedure even if the Diffie-Hellman procedure is run by the serving network 104B; (2) the home network 104A can now be informed of secret keys produced in the serving network 104B as a result of the Diffie-Hellman key exchange procedure; (3) the home network 104A and the serving network 104B can be given separate sets of keys for the protection of their communications with the user equipment 102; and (4) the user equipment 102 can have access to separate sets of keys for communicating with the serving network 104B and the home network 104A and both sets of keys can be based on the Diffie-Hellman procedure that produces secret keys with the PFS property.

Although described in relation to the home network 104A being separate from the serving network 104B, in some embodiments, the serving network 104B is within the home network 104A. For example, the serving network 104B may be defined by a certain portion of the home network 104A (i.e., a certain set of components of the home network 104A). For instance, the serving network 104B may include a set of access points and an access and mobility management function (AMF) 106. In this example, an authentication server function (AUSF) 108 of the home network 104A may indicate to the AMF 106 as to whether PFS is to be employed for communications between user equipment 102 and (1) the serving network 104B and/or (2) the home network 104A.

Each element of the network system 100 will now be described by way of example. In some embodiments, the network system 100 may include more elements than those shown in FIG. 1. For example, although shown with a single piece of user equipment (i.e., the user equipment 102), the network system 100 may include more pieces of user equipment (e.g., two or more pieces of user equipment). Accordingly, the network system 100 of FIG. 1 is for illustration purposes.

The user equipment 102 is any electronic device that allows a user to communicate within the home network 104A and the serving network 104B via a variety of interfaces. For example, the home network 104A and the serving network 104B may be Universal Terrestrial Radio Access Networks (UTRANs), Global System for Mobile communications (GSM) Enhanced Data Rates for GSM Evolution (EDGE) Radio Access Networks (GERANs), and/or Evolved Universal Mobile Telecommunications System (UMTS) Terrestrial Radio Access Networks (E-UTRANs). The user equipment 102 may interconnect with a UTRAN via a Uu interface, may interconnect with a GERAN via a Um interface, and may interconnect with an E-UTRAN via an LTE-Uu interface. The user equipment 102 may include one or more computation and/or communication devices capable of sending/receiving voice and/or data to/from the home network 104A and the serving network 104B. The user equipment 102 may include, for example, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, etc.

The home network 104A and the serving network 104B may be wireless networks that are capable of providing wireless network access to the user equipment 102 and/or one or more additional pieces of user equipment. For example, the home network 104A (sometimes abbreviated as HPLMN 104A) may be a GSM network that a user of the user equipment 102 is a subscriber of. In contrast, the serving network 104B (sometimes referred to as VPLMN 104B or visiting network 104B) is a GSM network that the user equipment 102 is currently registered/connected or is attempting to register/connect with. Accordingly, the user equipment 102 is roaming on the serving network 104B. In this example, user subscription data corresponding to the user of the user equipment 102 can reside in a Home Location Register (HLR) of the home network 104A. The HLR of the home network 104A may transfer the subscription data to a Visitor Location Register (VLR) during the user equipment 102 registering with the serving network 104B or a Gateway Mobile Switching Centre (GMSC) during mobile terminating call handling. Although shown and described in relation to a few components, the home network 104A and the serving network 104B may also contain various additional service components, such as a short message service centre (SMSC), service control point (SCP), etc.

Further, as noted above, although described in relation to the home network 104A being separate from the serving network 104B, in some embodiments, the serving network 104B is within the home network 104A. For example, the serving network 104A may be defined by a certain portion of the home network 104A (i.e., a certain set of components of the home network 104A).

In some embodiments, as shown in FIG. 1, the serving network 104B may include an access and mobility management function (AMF) 106. The AMF 106 is part of the 3rd Generation Partnership Project (3GPP) 5G Architecture and supports registration management, connection management, reachability management, mobility management, and various functions relating to security and access management and authorization. As also shown in FIG. 1, the home network 104A may include an authentication server function (AUSF) 108 that is used for security processes. As will be described below, the AMF 106 and the AUSF 108 may exchange requests, response, and/or other information for selectively employing PFS for communications between the user equipment 102 and the home network 104A and/or the serving network 104B based on a determination made by the home network 104A.

Figure 2:
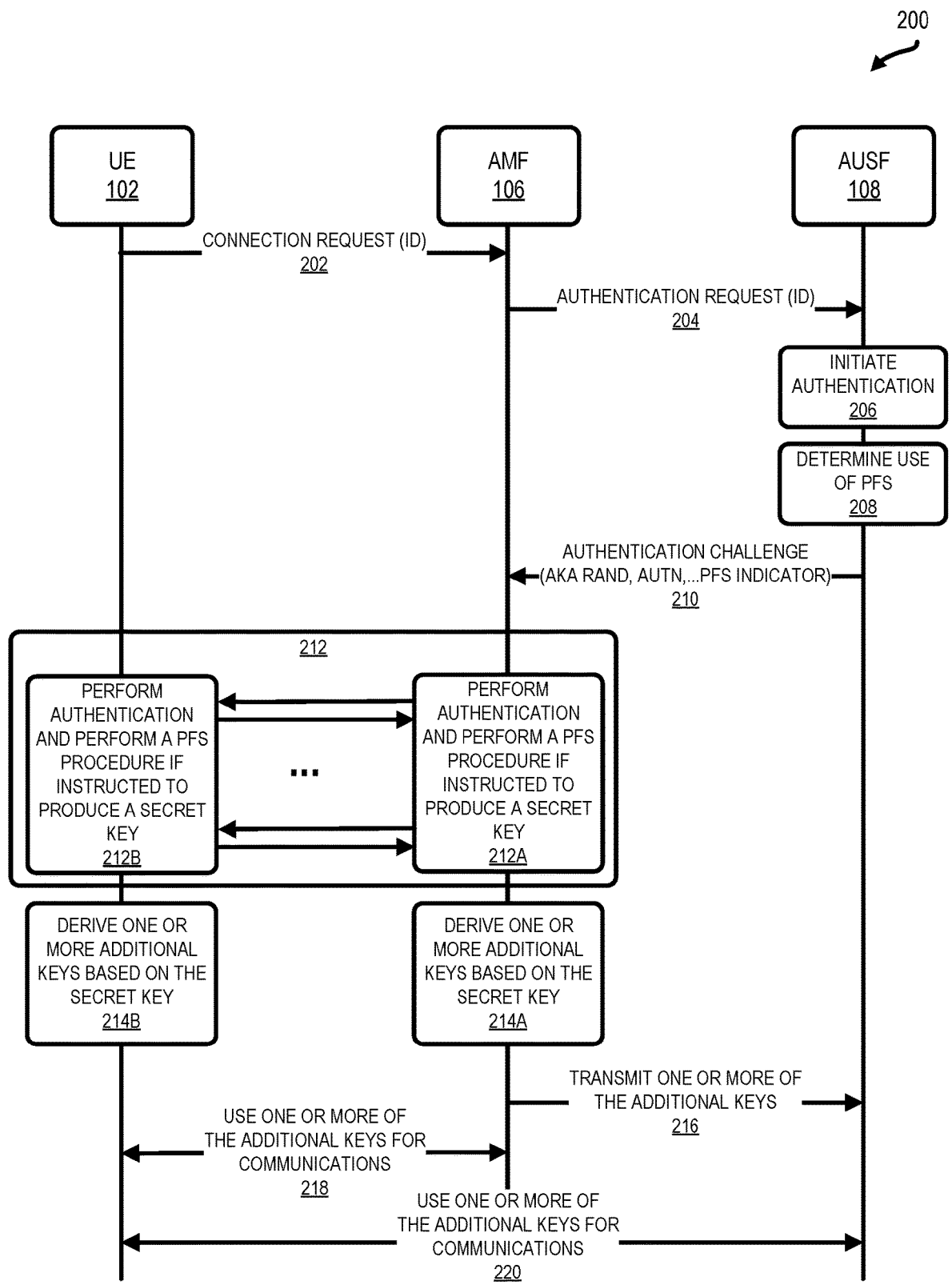
FIG. 2 shows a message exchange for the serving network to selectively employ perfect forward security (PFS) with the user equipment based on an indication from the home network, according to one example embodiment.

For example, FIG. 2 shows a message exchange 200 for the serving network 104B to selectively employ perfect forward security (PFS) with the user equipment 102 based on an indication from the home network 104A, according to one example embodiment. As will be described in greater detail below, the message exchange 200 produces/generates sets of keys, which satisfy the PFS property and that may be used for communications (1) between the serving network 104B and the user equipment 102 and/or (2) between the home network 104A and the user equipment 102. The operations in the message exchange 200 will be described with reference to the exemplary embodiments of the other figures. However, it should be understood that the operations of the message exchange 200 can be performed by embodiments of the invention other than those discussed with reference to the other figures, and the embodiments of the invention discussed with reference to these other figures can perform operations different than those discussed with reference to the flow diagrams.

Although shown and described as the AMF 106 of the serving network 104B and the AUSF 108 of the home network 104A performing operations of the message exchange 200, in other embodiments, other components of the serving network 104B and the home network 104A may perform these operations in conjunction with components of the user equipment 102. For example, a dedicated PFS component in each of the serving network 104B and the home network 104A may be used in place of the AMF 106 and the AUSF 108.

As shown in FIG. 2, the message exchange 200 may commence at operation 202 with the user equipment 102 transmitting a connection/authentication request to the serving network 104B. The connection request may include an identifier (ID) of the user equipment 102 and/or a user of the user equipment 102 and may be received by the AMF 106 of the serving network 104B. For example, the identifier of the connection request may include an International Mobile Subscriber Identity (IMSI) of the user of the user equipment 102. The IMSI is a unique number identifying a subscriber (e.g., the user of the user equipment 102) that is usually fifteen digits in length and is associated with GSM or Universal Mobile Telecommunications System (UMTS) network mobile phone/device users. As described above, the user of the user equipment 102 is a subscriber of the home network 104A; however, the user equipment 102 is roaming in this case and is accordingly attempting to register/connect/authenticate with the serving network 104B at operation 202.

At operation 204, the AMF 106 of the serving network 104B may transmit an authentication request to the home network 104A in response to receipt of the connection request from operation 202. The authentication request may include an identifier associated with the user equipment 102 (e.g., the IMSI of the user of the user equipment 102) and may be received by the AUSF 108 of the home network 104A. The authentication request is a message that requests authentication of the user equipment 102 in the network system 100. Since the user equipment 102 is roaming (i.e., connected to the serving network 104B instead of the home network 104A), information necessary to authenticate the user equipment 102 in the network system 100 is present in the home network 104A and is not present in serving network 104B. For example, an HLR of the home network 104A may include/store subscription data for the user of the user equipment 102 and may be used for authenticating the user equipment 102 in the network system 100.

In one embodiment, the authentication request may include an explicit request for a PFS indication. For example, the authentication request may include a set of bits that indicate whether input is desired from the home network 104A as to whether a PFS procedure should be performed by the user equipment 102 and the serving network 104B. In another embodiment, the authentication request may serve as an implicit request for a PFS indication.

At operation 206, the AUSF 108 of the home network 104A may commence performing authentication of the user equipment 102. In one embodiment, authentication may include performing an Authentication and Key Agreement (AKA) procedure, which is based on challenge-response mechanisms and symmetric cryptography. In this embodiment, commencing performing authentication at operation 206 may include generating an AKA authentication challenge message. The authentication challenge message may include one or more elements to allow the serving network 104B to perform the necessary authentication procedures with the user equipment 102. As will be described below, in one embodiment, the authentication challenge message may include a PFS indicator, which indicates whether a PFS procedure (e.g., a Diffie-Hellman key exchange procedure) is to be performed by the serving network 104B and the user equipment 102.

At operation 208, the AUSF 108 of the home network 104A determines whether a PFS procedure is to be performed between the serving network 104B and the user equipment 102. In one embodiment, the home network 104A may determine whether a PFS procedure is to be performed between the serving network 104B and the user equipment 102 based on (1) capabilities of the user equipment 102, the serving network 104B, and/or the home network 104A; (2) a preference of the home network 104A; and/or (3) a subscription level of the user of the user equipment 102. For example, a wireless subscription service of the user of the user equipment 102 may include PFS support. In this example, the home network 104A determines at operation 208 that a PFS procedure is to be performed between the serving network 104B and the user equipment 102 (i.e., a PFS indicator is set to "1"). In contrast, a wireless subscription service of the user of the user equipment 102 may not include PFS support. In this example, the home network 104A determines at operation 208 that a PFS procedure is not to be performed between the serving network 104B and the user equipment 102 (i.e., a PFS indicator is set to "0").

At operation 210, the AUSF 108 of the home network 104A may transmit one or more messages to the serving network 104B based on the authentication commenced by the home network 104A and the determination as to whether or not to perform a PFS procedure. For example, as described above, the authentication commenced by the home network 104A may include generating an AKA authentication challenge message. In one embodiment in which the AKA authentication challenge message includes a PFS indicator, the decision as to whether or not to perform a PFS procedure may be included in the PFS indicator. For example, the PFS indicator may be represented by a single bit. In this embodiment, when the PFS indicator has a value of "1" (i.e., a Boolean value of "True"), the PFS indicator indicates that a PFS procedure should be performed by the serving network 104B and the user equipment 102. In contrast, when the PFS indicator has a value of "0" (i.e., a Boolean value of "False"), the PFS indicator indicates that a PFS procedure should not be performed by the serving network 104B and the user equipment 102.

In some embodiments, additional information may be transmitted along with the PFS indicator to the serving network 104B. For example, as will be described in greater detail below, key generation information may be transmitted along with the PFS indicator (i.e., in the same message) or separate from the PFS indicator (i.e., in a separate message from the PFS indicator). The key generation information includes information related to key generation based on a secret key produced by a PFS procedure. For example, when the PFS procedure is a Diffie-Hellman key generation procedure that produces a secret key, which is shared by the user equipment 102 and the serving network 104B, the key generation information may include (1) an identifier or an indication of a function or a set of functions to be used for generating additional sets of keys based on the secret key and/or (2) function inputs that are to be used along with the secret key in the selected function(s) for generating additional keys as will be described in greater detail below.

Although shown and described above as the PFS indicator being transmitted along with authentication information (e.g., transmitted within an authentication message), in other embodiments, the PFS indicator and key generation information (e.g., information related to key generation based on a secret key produced by a Diffie-Hellman procedure) is transmitted in a different message by the home network 104A to the serving network 104B.

At operation 212, the AMF 106 of the serving network 104B may perform authentication and security mode setup using the authentication information received from the home network 104A and perform a PFS procedure when indicated to do so by the home network 104A. For example, as described above, the PFS procedure may be a Diffie-Hellman key exchange procedure. The Diffie-Hellman key exchange procedure is a process of securely exchanging cryptographic keys over a public channel and may be implemented using several different techniques. For instance, in one example embodiment, the Diffie-Hellman key exchange procedure uses the multiplicative group of integers modulo p, where p is prime, and g is a primitive root modulo p. These two values (p, g) are chosen in this way to ensure that the resulting shared secret can take on any value from 1 to p−1. For example, the serving network 104B and the user equipment 102 may agree to use a modulus p=23 and base g=5, which is a primitive root modulo 23. In this example, the serving network 104B chooses a secret integer a=4, then sends the user equipment 102 A=$g^a$ mod p=$5^4$ mod 23=4. The user equipment 102 chooses a secret integer b=3, then sends the serving network 104B B=$g^b$ mod p=$5^3$ mod 23=10. The user equipment 102 computes s=$B^a$ mod p=$10^4$ mod 23=18. The serving network 104B computes s=$A^b$ mod p=$4^3$ mod 23=18. The user equipment 102 and the serving network 104B now share a secret key/number (i.e., the secret key/number is 18). In this procedure, only a, b, and ($g^{ab}$ mod p=$g^{ba}$ mod p) are kept secret. All the other values (i.e., p, g, $g^a$ mod p, and $g^b$ mod p) are sent in the clear. Once the user equipment 102 and the serving network 104B compute the shared secret key, they can use the secret key as an encryption key, known only to them, for sending messages across the same open communication channel. Alternatively, the secret key may be used to generate additional sets of keys, which may be used for encryption or other purposes.

As shown in FIG. 2, the authentication, security, and Diffie-Hellman key exchange procedures may involve message exchanges between the serving network 104B and the user equipment 102. Accordingly, performing the authentication, security, and Diffie-Hellman key exchange procedures may include sub-operation 212A and the sub-operation 212B in which the serving network 104B and the user equipment 102 perform their respective sub-operations.

In one embodiment, the secret key derived using the Diffie-Hellman key exchange procedure may be used to derive multiple additional keys for use during communications between (1) the user equipment 102 and the serving network 104B and (2) the user equipment 102 and the home network 104A. In particular, at operation 214A, the user equipment 102 using the secret/primary key of operation 212 may derive a set of secondary keys. A first key in the set of secondary keys may be used for communications between the user equipment 102 and the serving network 104B and a second key in the set of secondary keys may be used for communications between the user equipment 102 and the home network 104A. Similarly, at operation 214B, the serving network 104B using the secret/primary key of operation 212 may derive the set of secondary keys, including (1) the first key for use in communications between the user equipment 102 and the serving network 104B and (2) the second key for use in communications between the user equipment 102 and the home network 104A. To arrive at the same set of secondary keys (i.e., such that the first key generated at operation 214A is the same as the first key generated at operation 214B and the second key generated at operation 214A is the same as the second key generated at operation 214B) the user equipment 102 and the serving network 104B may be pre-configured to share a key definition function (KDF) and corresponding input values. For example, the key definition function may take as inputs (1) a first input value that is the secret key derived using the Diffie-Hellman key exchange procedure and (2) a second input value that may be variably defined. For example, while the first input value is the secret key generated at operation 212, the second input value may be changed depending on the applicable network. For example, the first key in the set of secondary keys may be used for encrypting communications between the user equipment 102 and the serving network 104B ($Key_{UE\text{-}serving\_network}$) and may be defined as shown in Equation 1 below:

$$Key_{UE\text{-}serving\_network} = KDF(Secret\_Key_{Diffie\text{-}Herman}, \text{"serving network"}) \quad \text{Equation 1}$$

In contrast, the second key in the set of secondary keys may be used for encrypting communications between the user equipment 102 and the home network 104A ($Key_{UE\text{-}home\_network}$) and may be defined as shown in Equation 2 below:

$$Key_{UE\text{-}home\_network} = KDF(Secret\_Key_{Diffie\text{-}Herman}, \text{"home network"}) \quad \text{Equation 2}$$

Accordingly, the second input value in each use of the key definition function is a string value corresponding to the applicable network (i.e., "serving network" for the $Key_{UE\text{-}serving\_network}$, which is used for communications between the user equipment 102 and the serving network 104B, and "home network" for the $Key_{UE\text{-}home\_network}$, which is used for communications between the user equipment 102 and the serving network 104A). In some embodiments, second input values may be shared between the user equipment 102 and the home/serving networks 104A/104B prior to attempting to connect or authenticate while in other embodiments, second input values may be shared between the user equipment 102 and the home/serving networks 104A/104B during the connection and/or authentication process. For example, one or more messages transmitted by the home network 104A to the serving network 104B may include second input values (e.g., "serving network" and "home network") or an indication on how to derive the second input values. In particular, key generation information may be transmitted along with the PFS indicator (i.e., in the same message) or separate from the PFS indicator (i.e., in a separate message from the PFS indicator). The key generation information includes information related to key generation based on a secret key produced by a PFS procedure. For example, when the PFS procedure is a Diffie-Hellman key generation procedure that produces a secret key, which is shared by the user equipment 102 and the serving network 104B, the key generation information may include (1) an identifier or an indication of a key definition function to be used for generating additional sets of keys based on the secret key and/or (1) function inputs that are to be used along with the secret key in the selected key definition function for generating additional sets of keys.

In some embodiments, the keys generated using the PFS procedure are cryptographically bound to the primary authentication technique via AKA, ensuring that the PFS procedure can only have been performed by some entity that has knowledge of the AKA keys. Otherwise, there is a possibility for a man-in-the-middle/tunneling attack where a PFS/Diffie-Hellman procedure is run between the serving network 104B and the man-in-the-middle attacker, but the primary authentication procedure is run between the serving network 104B and the user equipment 102 (behind the attacker).

At operation 216, the serving network 104B may inform the home network 104A of one or more keys derived at operations 214 and/or 216. For example, the serving network 104B may transmit a message indicating a response or result of the authentication of the user equipment 102. In this example, along with a response or result of the authentication of the user equipment 102 (e.g., an AKA RES message), the message may include one or more keys derived at operations 214 and/or 216. Accordingly, the home network 104A may be informed of keys used by the user equipment 102 and the serving network 104B for performing communications.

At operation 218A, the user equipment 102 and the serving network 104B uses generated keys to perform communications. These communications may be performed between the user equipment 102 and the AMF 106, RAN, etc. In some embodiments, $Key_{UE\text{-}serving\_network}$ and $Key_{UE\text{-}home\_network}$ can be used as root keys in further key derivation. For example, $Key_{UE\text{-}serving\_network}$ can be used as an input to derive a new key $K_{AMF}$ using another key definition function. The key $K_{AMF}$ is the root key used between the user equipment 102 and the AMF 106 of the serving network 104B to derive security keys for the Non-Access Stratum (NAS) protocol and/or the Packet Data Convergence Protocol (PDCP). In another example, $Key_{UE\text{-}home\_network}$ can be used as an input to derive a new key $K_{AUSF}$. The key $K_{AUSF}$ is the root key used between the user equipment 102 and the AUSF 108 of the home network 104A.

As described above, based on the message exchange 200, the decision on whether PFS is to be employed is made by the home network 104A while the performance of procedures to accomplish PFS (e.g., a Diffie-Hellman procedure), is made by the serving network 104B. The serving network 104B may thereafter (1) use a set of generated keys for communications with the user equipment 102 and (2) distribute a set of keys to the home network 104A such that the home network 104A can use this received set of keys for communications with the user equipment 102. In this fashion (1) the home network 104A can now control whether PFS is employed between the serving network 104B and the user equipment 102, such as through performance of a Diffie-Hellman procedure even if the Diffie-Hellman procedure is run by the serving network 104B; (2) the home network 104A can now be informed of the keys produced in the serving network 104B as a result of the Diffie-Hellman procedure; (3) the home network 104A and the serving network 104B can be given separate keys for the protection of their communications with the user equipment 102; and (4) the user equipment 102 can be informed of separate keys for communicating with the serving network 104B and the home network 104A and both keys can be based on the Diffie-Hellman procedure that produces keys with the PFS property.

Figure 3:
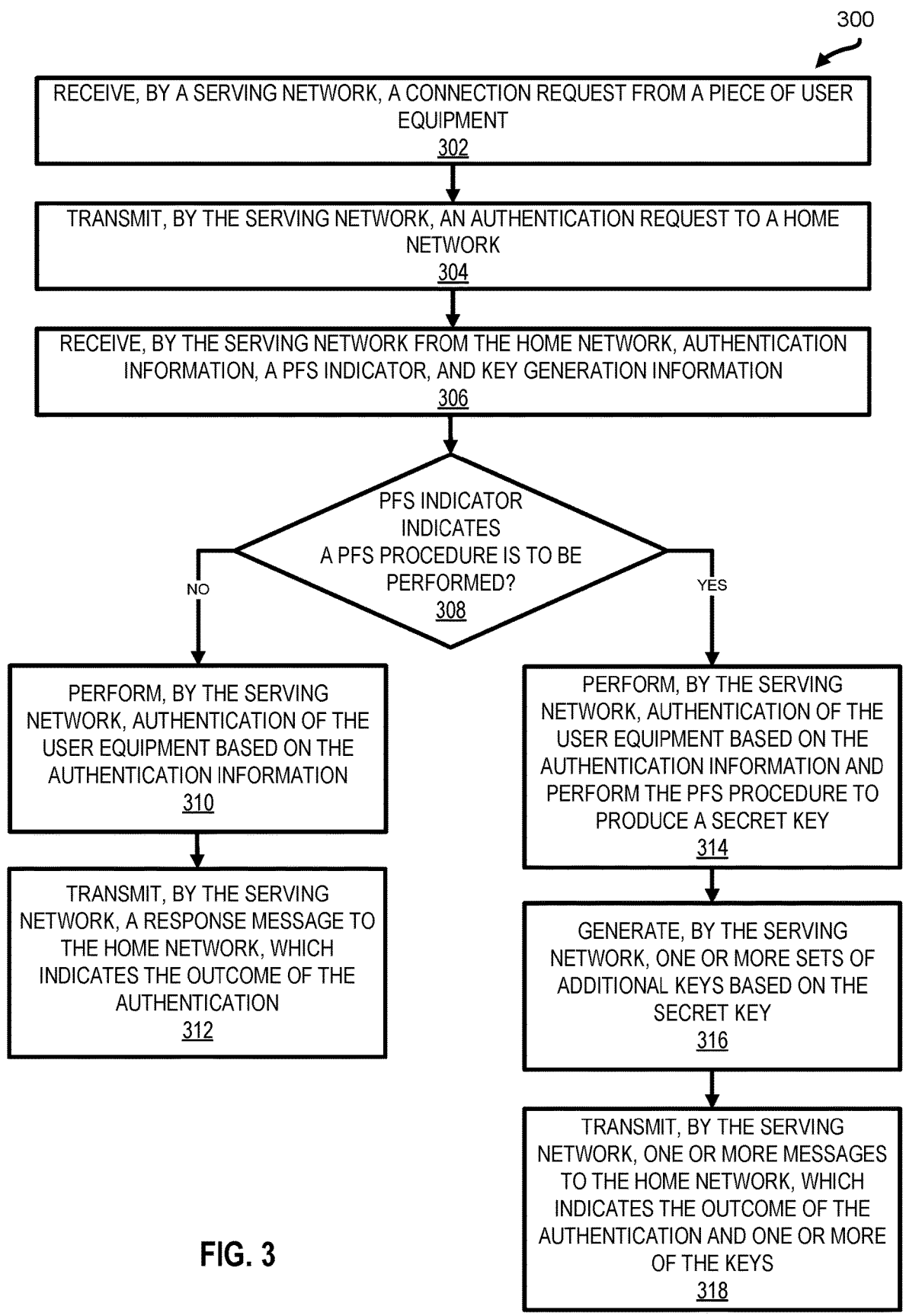
FIG. 3 illustrates a method for the serving network to selectively employ PFS based on an indication from the home network, according to one example embodiment.

FIG. 3 is a method 300 for the serving network 104B to selectively employ PFS based on an indication from the home network 104A, according to one example embodiment. The operations in the flow diagram will be described with reference to the exemplary embodiments of the other figures. However, it should be understood that the operations of the flow diagram can be performed by embodiments of the invention other than those discussed with reference to the other figures, and the embodiments of the invention discussed with reference to these other figures can perform operations different than those discussed with reference to the flow diagrams.

As shown in FIG. 3, the method 300 may commence with the serving network 104B receiving a connection request from the user equipment 102. As noted above, the connection request may include an identifier (ID) of the user equipment 102 and/or a user of the user equipment 102 and may be received by the AMF 106 of the serving network 104B. For example, the identifier of the connection request may include an IMSI of the user of the user equipment 102. As described above, the user of the user equipment 102 is a subscriber of the home network 104A; however, the user equipment 102 is roaming in this case and is accordingly attempting to register/connect with the serving network 104B at operation 302.

At operation 304, the serving network 104B may transmit an authentication request to the home network 104A in response to receipt of the connection request from operation 302. The authentication request may include an identifier of the user equipment 102 (e.g., the IMSI of the user of the user equipment 102) and may be received by the AUSF 108 of the home network 104A. The authentication request is a message that requests authentication of the user equipment 102 in the network system 100.

At operation 306, the serving network 104B may receive one or more of (1) authentication information, (2) a PFS indicator, and (3) key generation information from the home network 104A. Each of these pieces of information may be contained in the same message or may be separated into two or more separate messages that are transmitted from the home network 104A to the serving network 104B. For example, the set of messages from the home network 104A may include an AKA authentication challenge message, which includes authentication information, a PFS indicator, and key generation information. In another example, the authentication information is included in an AKA authentication challenge message while the PFS indicator and the key generation information are included in a separate message. The PFS indicator indicates whether or not the serving network 104B is to perform a PFS procedure with the user equipment 102 and the key generation information may include function inputs that are to be used along with a secret key for generating additional keys as will be described in greater detail below.

At operation 308, the serving network 104B may determine whether a PFS procedure is to be performed by the serving network 104B in conjunction with the user equipment 102. For example, the PFS indicator may be represented by a single bit. In this embodiment, when the PFS indicator has a value of "1" (i.e., a Boolean value of "True"), the PFS indicator indicates that a PFS procedure should be performed by the serving network 104B and the user equipment 102. In contrast, when the PFS indicator has a value of "0" (i.e., a Boolean value of "False"), the PFS indicator indicates that a PFS procedure should not be performed by the serving network 104B and the user equipment 102. In one embodiment, the home network 104A may determine whether a PFS procedure is to be performed between the serving network 104B and the user equipment 102 based on (1) capabilities of the user equipment 102, the serving network 104B, and/or the home network 104A; (2) a preference of the home network 104A; and/or (3) a subscription level of the user of the user equipment 102. For example, a wireless subscription service of the user of the user equipment 102 may include PFS support. In response to the serving network 104B determining at operation 308 that a PFS procedure should not be performed, the method 300 may move to operation 310.

At operation 310, the serving network 104B may perform authentication with the user equipment based on the authentication information. In particular, the serving network 104B may complete the AKA procedure using information from SIM/USIM cards of the user equipment and authentication information received from the home network 104A. However, a PFS procedure (e.g., a Diffie-Hellman procedure) is not performed based on the determination from operation 308.

At operation 312, the serving network 104B may transmit an authentication response message to the home network 104A. The authentication response message indicates an outcome of the authentication (e.g., an AKA RES message that indicates whether the AKA authentication procedure with the user equipment 102 was successful or unsuccessful).

Returning to operation 308, in response to the serving network 104B determining at operation 308 that a PFS procedure should be performed, the method 300 may move to operation 314. At operation 314, the serving network 104B may perform authentication and security mode setup using the authentication information received from the home network 104A and perform a PFS procedure as instructed by the home network 104A. For example, as described above, the PFS procedure may be a Diffie-Hellman key exchange procedure that produces a secret key, which is shared between the user equipment 102 and the serving network 104B. The Diffie-Hellman key exchange procedures may involve multiple message exchanges between the serving network 104B and the user equipment 102. Accordingly, performing the authentication, security, and Diffie-Hellman key exchange procedures may include operations by both the serving network 104B and the user equipment 102.

At operation 316, the serving network 104B may derive one or more additional keys based on the secret key derived using the Diffie-Hellman key exchange procedure (sometimes referred to herein as the primary key). These additional keys may be used for securing communications between (1) the user equipment 102 and the serving network 104B and (2) the user equipment 102 and the home network 104A. In particular, the serving network 104B using the secret/primary key of operation 314 may derive a set of secondary keys. A first key in the set of secondary keys may be used for securing communications between the user equipment 102 and the serving network 104B and a second key in the set of secondary keys may be used for communications between the user equipment 102 and the home network 104A. This same set of secondary keys may be generated by the user equipment 102 using the secret/primary key. To arrive at the same set of keys the user equipment 102 and the serving network 104B may be pre-configured to share a key definition function (KDF) and corresponding input values. For example, the key definition function may take as inputs (1) a first input value that is the secret/primary key derived using the Diffie-Hellman key exchange procedure and (2) a second input value that may be variably defined. In particular, while the first input value is the secret/primary key generated at operation 314, the second input value be changed depending on the applicable network as described above in relation to Equation 1 and Equation 2. In some embodiments, second input values may be shared between the user equipment 102 and the home/serving networks 104A/104B prior to attempting to connect or authenticate while in other embodiment, second input values may be shared between the user equipment 102 and the home/serving networks 104A/104B during the connection and/or authentication process. For example, one or more messages transmitted by the home network 104A to the serving network 104B may include second input values (e.g., "serving network" and "home network") or an indication on how to derive the second input values. In particular, as noted above, key generation information may be received by the serving network 104B at operation 306. The key generation information may indicate second input values for the key definition function and/or a particular key definition function to use. This key generation information may be passed to the user equipment 102 during or after authentication of the user equipment 102 such that the user equipment 102 can generate the same set of secondary keys.

In some embodiments, the set of secondary keys can be used as root keys in further key derivation at operation 316 (i.e., to derive a set of tertiary keys). For example, a first key in the set of secondary keys can be used as an input to derive a new key $K_{AMF}$. The key $K_{AMF}$ is the root key used between the user equipment 102 and the AMF 106 of the serving network 104B to derive security keys for the Non-Access Stratum (NAS) protocol and/or the Packet Data Convergence Protocol (PDCP). In another example, a second key in the set of secondary keys can be used as an input to derive a new key $K_{AUSF}$. The key $K_{AUSF}$ is the root key used between the user equipment 102 and the AUSF 108 of the home network 104A.

In some embodiments, the keys generated using the PFS procedure are cryptographically bound to the primary authentication technique via AKA, ensuring that the PFS procedure can only have been performed by some entity that has knowledge of the AKA keys. Otherwise, there is a possibility for a man-in-the-middle/tunneling attack where a PFS/Diffie-Hellman procedure is run between the serving network 104B and the man-in-the-middle attacker, but the primary authentication procedure is run between the serving network 104B and the user equipment 102 (behind the attacker).

At operation 318, the serving network 104B may inform the home network 104A of one or more keys derived at operations 314 and/or 316. For example, the serving network 104B may transmit a message indicating a response or result of the authentication of the user equipment 102. In this example, along with a response or result of the authentication of the user equipment 102 (e.g., an AKA RES message), the message may include one or more keys derived at operations 314 and/or 316. Accordingly, the home network 104A may keep track of keys used by the user equipment 102 and the serving network 104B for performing communications and become aware of keys that should be used for securing communications between the user equipment 102 and the home network 104A.

As described above, based on the message exchange in the method 300, the decision on whether PFS is to be employed is made by the home network 104A while the performance of procedures to accomplish PFS (e.g., a Diffie-Hellman procedure), is made by the serving network 104B. The serving network 104B may thereafter (1) use a set of generated keys for communications with the user equipment 102 and (2) distribute a set of keys to the home network 104A such that the home network 104A can use this received set of keys for communications with the user equipment 102. In this fashion (1) the home network 104A can now control whether PFS is employed between the serving network 104B and the user equipment 102, such as through performance of a Diffie-Hellman procedure even if the Diffie-Hellman procedure is run by the serving network 104B; (2) the home network 104A can now be informed of the keys produced in the serving network 104B as a result of the Diffie-Hellman procedure; (3) the home network 104A and the serving network 104B can be given separate keys for the protection of their communications with the user equipment 102; and (4) the user equipment 102 can be informed of separate keys for communicating with the serving network 104B and the home network 104A and both keys can be based on the Diffie-Hellman procedure that produces keys with the PFS property.

Figure 4:
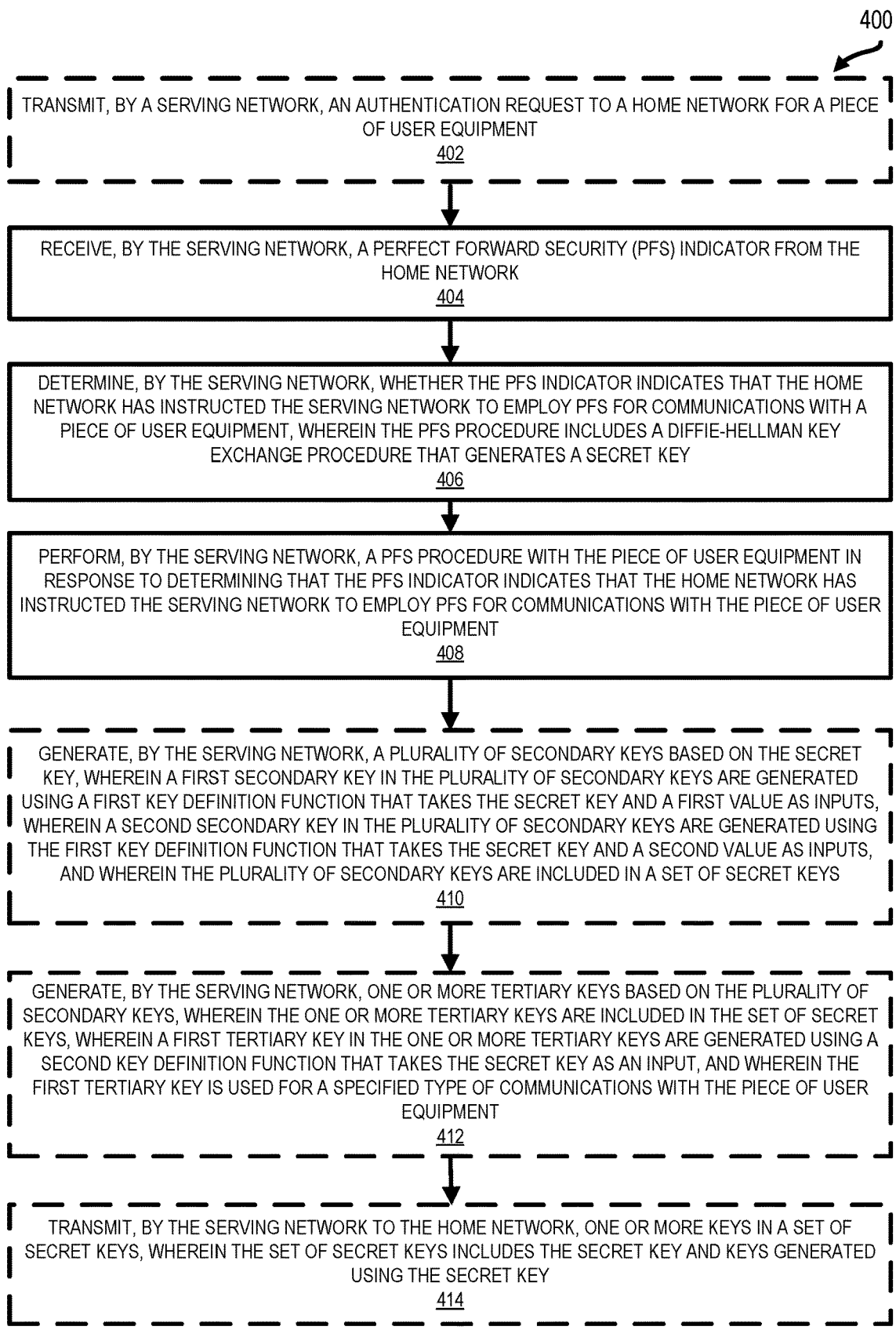
FIG. 4 illustrates a method for the serving network to selectively employ PFS based on an indication from the home network, according to another example embodiment.

FIG. 4 is another method 400 for the serving network 104B to selectively employ PFS based on an indication from the home network 104A, according to one example embodiment. The operations in the flow diagram will be described with reference to the exemplary embodiments of the other figures. However, it should be understood that the operations of the flow diagram can be performed by embodiments of the invention other than those discussed with reference to the other figures, and the embodiments of the invention discussed with reference to these other figures can perform operations different than those discussed with reference to the flow diagrams.

As shown in FIG. 4, the method 400 may commence at operation 402 with the serving network 104B, transmitting an authentication request to the home network 104A for a piece of user equipment 102.

At operation 404, the serving network 104B receives a perfect forward security (PFS) indicator from the home network 104A.

At operation 406, the serving network 104B determines whether the PFS indicator indicates that the home network 104A has instructed the serving network 104B to employ PFS for communications with the piece of user equipment 102.

At operation 408, the serving network 104B performs a PFS procedure with the piece of user equipment 102 in response to determining that the PFS indicator indicates that the home network 104A has instructed the serving network 104B to employ PFS for communications with the piece of user equipment 102, wherein the PFS procedure includes a Diffie-Hellman key exchange procedure that generates a secret key. In some embodiments, the home network 104A is a network to which a user of the piece of the user equipment 102 is a subscriber but is not currently connected and the serving network 104B is separate from the home network 104A and the piece of user equipment 102 with which the home network 104A is attempting to connect, and the PFS indicator is set by the home network 104A based on one or more of a subscription level of the user of the piece of user equipment 102, capabilities of the piece of user equipment 102, and capabilities of the home network 104A or the serving network 104B. In some embodiments, the serving network 104B is within the home network 104A.

At operation 410, the serving network 104B generates a plurality of secondary keys based on the secret key, wherein a first secondary key in the plurality of secondary keys are generated using a first key definition function that takes the secret key and a first value as inputs, wherein a second secondary key in the plurality of secondary keys are generated using the first key definition function that takes the secret key and a second value as inputs, and wherein the plurality of secondary keys are included in a set of secret keys. In some embodiments, the first secondary key in the plurality of secondary keys is assigned for communications between the serving network 104B and the piece of user equipment 102 and the second secondary key in the plurality of secondary keys is assigned for communications between the home network 104A and the piece of user equipment 102.

At operation 412, the serving network 104B generates one or more tertiary keys based on the plurality of secondary keys, wherein the one or more tertiary keys are included in the set of secret keys, wherein a first tertiary key in the one or more tertiary keys are generated using a second key definition function that takes the secret key as an input, and wherein the first tertiary key is used for a specified type of communications with the piece of user equipment 102. In some embodiments, the specified type of communications is one of Non-Access Stratum (NAS) protocol communications and Packet Data Convergence Protocol (PDCP) communications. In some embodiments, the PFS indicator is received by the serving network 104B from the home network 104A along with key definition information, which includes one or more of the first value, the second value, an indicator for the first key definition function, and an indicator for the second key definition function.

At operation 414, the serving network 104B transmits to the home network 104A, one or more keys in a set of secret keys, wherein the set of secret keys includes the secret key and keys generated using the secret key. In some embodiments, the PFS indicator and the authentication information are included in the same message transmitted from the home network 104A. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between 500A-500B, 500B-500C, 500C-500D, 500D-500E, 500E-500F, 500F-500G, and 500A-500G, as well as between 500H and each of 500A, 500C, 500D, and 500G. These NDs are physical devices, and the connectivity between these NDs can be wireless or wired (often referred to as a link). An additional line extending from NDs 500A, 500E, and 500F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a special-purpose operating system (OS); and 2) a general purpose network device 504 that uses common off-the-shelf (COTS) processors and a standard OS.

The special-purpose network device 502 includes networking hardware 510 comprising a set of one or more processor(s) 512, forwarding resource(s) 514 (which typically include one or more ASICs and/or network processors), and physical network interfaces (NIs) 516 (through which network connections are made, such as those shown by the connectivity between NDs 500A-H), as well as non-transitory machine readable storage media 518 having stored therein networking software 520. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

The special-purpose network device 502 is often physically and/or logically considered to include: 1) a ND control plane 524 (sometimes referred to as a control plane) comprising the processor(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the processor(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/

Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and physical NIs 546, as well as non-transitory machine readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization. For example, in one such alternative embodiment the virtualization layer 554 represents the kernel of an operating system (or a shim executing on a base operating system) that allows for the creation of multiple instances 562A-R called software containers that may each be used to execute one (or more) of the sets of applications 564A-R; where the multiple software containers (also called virtualization engines, virtual private servers, or jails) are user spaces (typically a virtual memory space) that are separate from each other and separate from the kernel space in which the operating system is mm and where the set of applications running in a given user space, unless explicitly allowed, cannot access the memory of the other processes. In another such alternative embodiment the virtualization layer 554 represents a hypervisor (sometimes referred to as a virtual machine monitor (VMM)) or a hypervisor executing on top of a host operating system, and each of the sets of applications 564A-R is run on top of a guest operating system within an instance 562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 540, directly on a hypervisor (in which case the unikernel is sometimes described as running within a LibOS virtual machine), or in a software container, embodiments can be implemented fully with unikernels running directly on a hypervisor represented by virtualization layer 554, unikernels running within software containers represented by instances 562A-R, or as a combination of unikernels and the above-described techniques (e.g., unikernels and virtual machines both run directly on a hypervisor, unikernels and sets of applications that are run in different software containers).

The instantiation of the one or more sets of one or more applications 564A-R, as well as virtualization if implemented, are collectively referred to as software instance(s) 552. Each set of applications 564A-R, corresponding virtualization construct (e.g., instance 562A-R) if implemented, and that part of the hardware 540 that executes them (be it hardware dedicated to that execution and/or time slices of hardware temporally shared), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 562A-R to VNEs also apply to embodiments where such a finer level of granularity and/or unikernels are used.

In certain embodiments, the virtualization layer 554 includes a virtual switch that provides similar forwarding services as a physical Ethernet switch. Specifically, this virtual switch forwards traffic between instances 562A-R and the physical NI(s) 546, as well as optionally between the instances 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 5C:
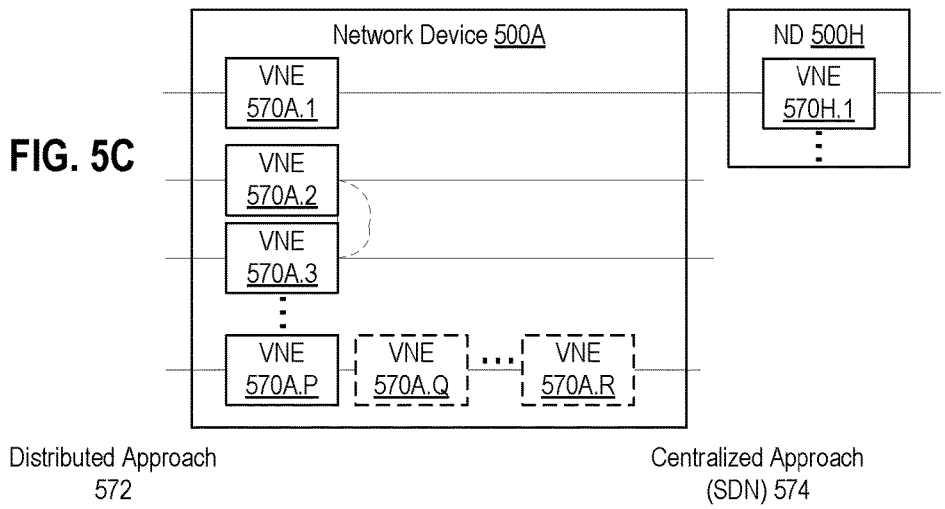
FIG. 5C illustrates various exemplary ways in which virtual network elements (VNEs) may be coupled according to some embodiments of the invention.

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service— e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software instances 562A-R may operate as servers; the same would be true for the hybrid network device 506; in the case of the special-purpose network device 502, one or more such servers could also be run on a virtualization layer executed by the processor(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 5D:
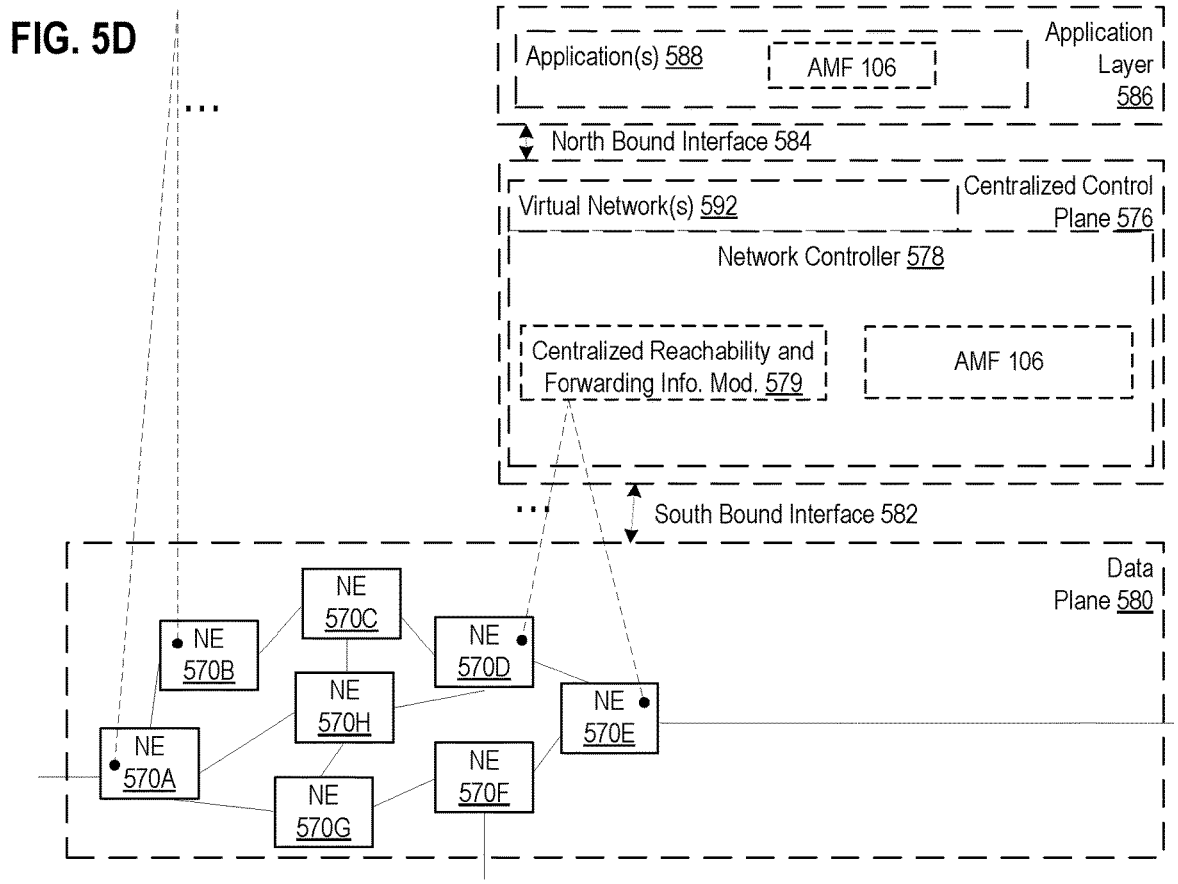
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE))

that communicate with other NEs to exchange routes, and then selects those routes based on one or more routing metrics. Thus, the NEs 570A-H (e.g., the processor(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software-defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the processor(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
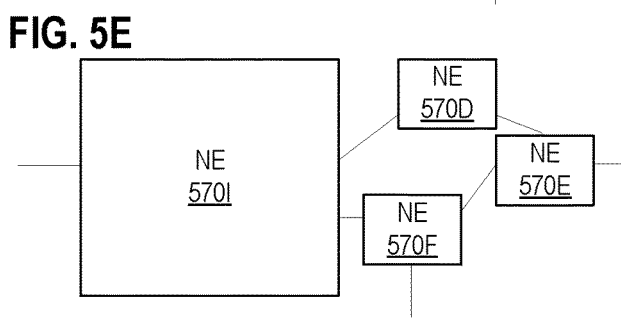
FIG. 5E illustrates the simple case of where each of the NDs implements a single NE, but a centralized control plane has abstracted multiple of the NEs in different NDs into (to represent) a single NE in one of the virtual network(s), according to some embodiments of the invention.
Figure 5F:
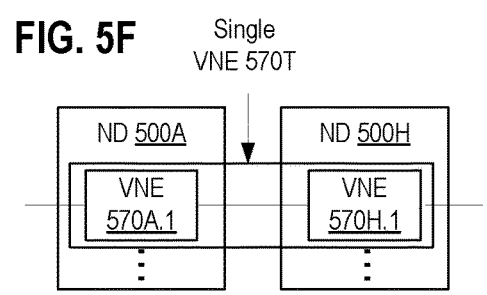
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments of the invention. FIG. 5E shows that in this virtual network, the NE 5701 is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
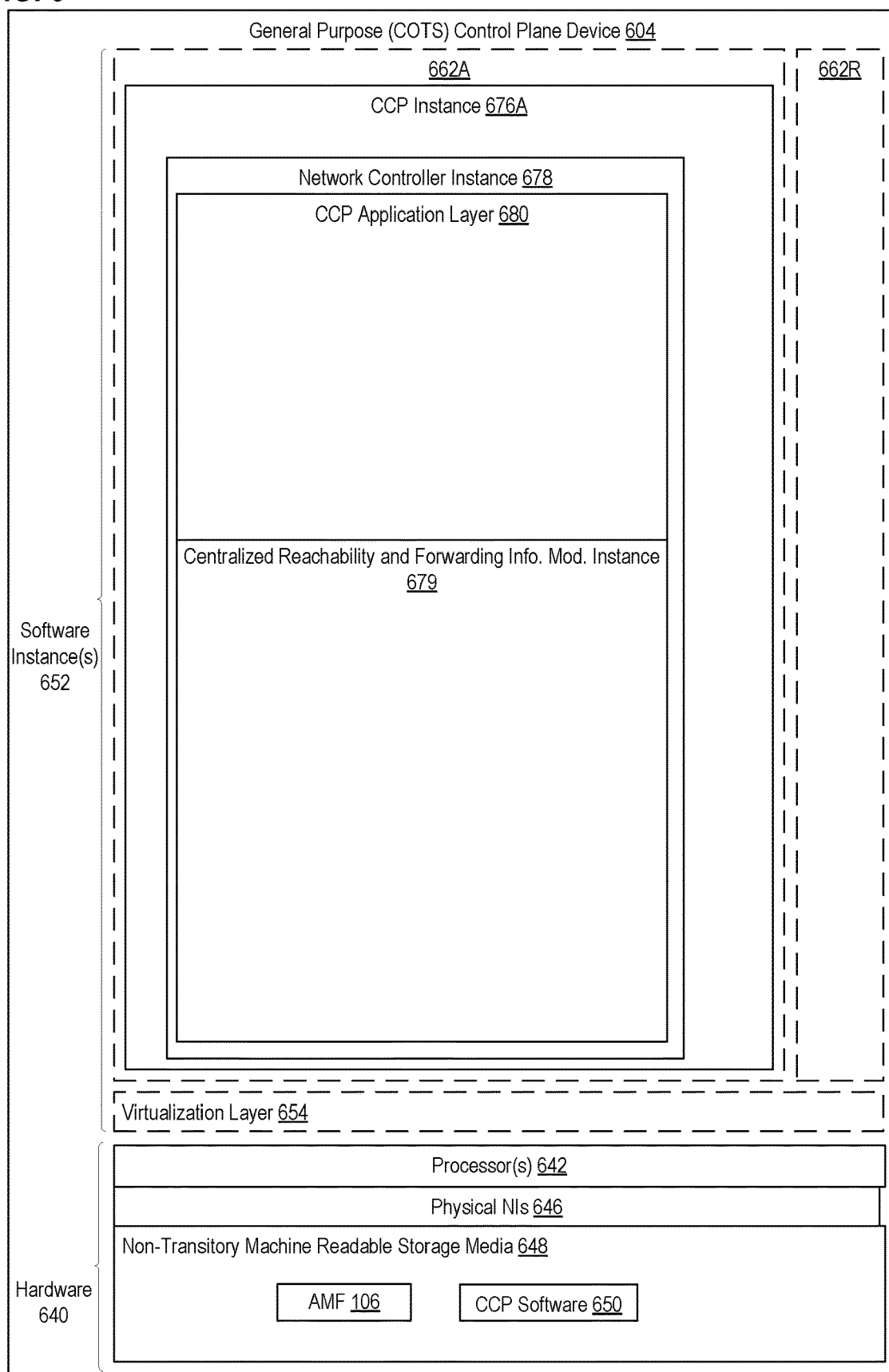
FIG. 6 illustrates a general purpose control plane device with centralized control plane (CCP) software 650, according to some embodiments of the invention.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and physical NIs 646, as well as non-transitory machine readable storage media 648 having stored therein centralized control plane (CCP) software 650.

In embodiments that use compute virtualization, the processor(s) 642 typically execute software to instantiate a virtualization layer 654 (e.g., in one embodiment the virtualization layer 654 represents the kernel of an operating system (or a shim executing on a base operating system) that allows for the creation of multiple instances 662A-R called software containers (representing separate user spaces and also called virtualization engines, virtual private servers, or jails) that may each be used to execute a set of one or more applications; in another embodiment the virtualization layer 654 represents a hypervisor (sometimes referred to as a virtual machine monitor (VMM)) or a hypervisor executing on top of a host operating system, and an application is run on top of a guest operating system within an instance 662A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 640, directly on a hypervisor represented by virtualization layer 654 (in which case the unikernel is sometimes described as running within a LibOS virtual machine), or in a software container represented by one of instances 662A-R). Again, in embodiments where compute virtualization is used, during operation an instance of the CCP software 650 (illustrated as CCP instance 676A) is executed (e.g., within the instance 662A) on the virtualization layer 654. In embodiments where compute virtualization is not used, the CCP instance 676A is executed, as a unikernel or on top of a host operating system, on the "bare metal" general purpose control plane device 604. The instantiation of the CCP instance 676A, as well as the virtualization layer 654 and instances 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user-interfaces). At a more abstract level, this CCP application layer 680 within the centralized control plane 576 works with virtual network view(s) (logical view(s) of the network) and the middleware layer provides the conversion from the virtual networks to the physical view.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for a serving network to selectively employ perfect forward security (PFS) based on an indication from a home network, the method comprising:
   receiving, by the serving network, a PFS indicator from the home network, the PFS indicator is set by the home network based on a subscription level of the user of a piece of user equipment and capabilities of the piece of user equipment;
   determining, by the serving network, whether the PFS indicator indicates that the home network has instructed the serving network to employ PFS for communications with the piece of user equipment;
   performing, by the serving network, a PFS procedure with the piece of user equipment in response to determining that the PFS indicator indicates that the home network has instructed the serving network to employ PFS for communications with the piece of user equipment, wherein a secret key is generated in the PFS procedure between the serving network and the piece of user equipment, and wherein the home network communicates with the piece of user equipment based on the secret key generated in the PFS procedure;
   transmitting, by the serving network to the home network, one or more keys in a set of secret keys, the set of secret keys includes the secret key and keys generated using the secret key;
   generating, by the serving network, a plurality of secondary keys based on the secret key, a first secondary key in the plurality of secondary keys is generated using a first key definition function that takes the secret key and a first value as inputs, a second secondary key in the plurality of secondary keys is generated using the first key definition function that takes the secret key and a second value as inputs, and the plurality of secondary keys are included in the set of secret keys;
   generating, by the serving network, one or more tertiary keys based on the plurality of secondary keys, the one or more tertiary keys are included in the set of secret keys, a first tertiary key in the one or more tertiary keys is generated using a second key definition function that takes the secret key as an input, and the first tertiary key is used for a specified type of communications with the piece of user equipment;
   the specified type of communications is one of Non-Access Stratum (NAS) protocol communications and Packet Data Convergence Protocol (PDCP) communications; and
   receiving, by the serving network, a key generation information together with the PFS indicator, including one or more of the first value, the second value, an indicator for the first key definition function, and an indicator for the second key definition function.

2. The method of claim 1, wherein the PFS procedure includes a Diffie-Hellman key exchange procedure that generates the secret key.

3. The method of claim 1, wherein the first secondary key in the plurality of secondary keys is assigned for communications between the serving network and the piece of user equipment and the second secondary key in the plurality of secondary keys is assigned for communications between the home network and the piece of user equipment.

4. The method of claim 1, wherein the PFS indicator is received by the serving network from the home network along with key definition information, which includes one or more of the first value, the second value, an indicator for the first key definition function, and an indicator for the second key definition function.

5. The method of claim 1, further comprising:
   transmitting, by the serving network, an authentication request to the home network for the piece of user equipment, wherein the PFS indicator and authentication information are received from the home network in response to the authentication request.

6. The method of claim 5, wherein the PFS indicator and the authentication information are included in the same message transmitted from the home network.

7. The method of claim 1, wherein the home network is a network to which a user of the piece of the user equipment is a subscriber but is not currently connected and the serving network is separate from the home network and the piece of user equipment with which the home network is attempting to connect.

8. The method of claim 1, wherein the serving network is within the home network.

9. A network device to function as a switch in a serving network to selectively employ perfect forward security (PFS) based on an indication from a home network, the network device comprising:
   a set of one or more processors; and
   a non-transitory machine-readable storage medium having stored therein an access and mobility management function, which when executed by the set of one or more processors, causes the switch to receive a PFS indicator from the home network, the PFS indicator is set by the home network based on a subscription level of the user of a piece of user equipment and capabilities of the piece of user equipment, determine whether the PFS indicator indicates that the home network has instructed the serving network to employ PFS for communications with the piece of user equipment, and perform a PFS procedure with the piece of user equipment in response to determining that the PFS indicator indicates that the home network has instructed the serving network to employ PFS for communications with the piece of user equipment, wherein a secret key is generated in the PFS procedure between the serving network and the piece of user equipment, and wherein the home network communicates with the piece of user equipment based on the secret key generated in the PFS procedure;

the access and mobility management function, when executed by the set of one or more processors, further causes the switch to transmit, to the home network, one or more keys in a set of secret keys, the set of secret keys includes the secret key and keys generated using the secret key;

the access and mobility management function, when executed by the set of one or more processors, further causes the switch to generate a plurality of secondary keys based on the secret key, a first secondary key in the plurality of secondary keys is generated using a first key definition function that takes the secret key and a first value as inputs, a second secondary key in the plurality of secondary keys is generated using the first key definition function that takes the secret key and a second value as inputs, and the plurality of secondary keys are included in the set of secret keys;

the access and mobility management function, when executed by the set of one or more processors further causes the switch to generate one or more tertiary keys based on the plurality of secondary keys, the one or more tertiary keys are included in the set of secret keys, a first tertiary key in the one or more tertiary keys is generated using a second key definition function that takes the secret key as an input, and the first tertiary key is used for a specified type of communications with the piece of user equipment;

the specified type of communications is one of Non-Access Stratum (NAS) protocol communications and Packet Data Convergence Protocol (PDCP) communications; and the access and mobility management function, when executed by the set of one or more processors further causes the switch to receive a key generation information together with the PFS indicator that includes one or more of the first value, the second value, an indicator for the first key definition function, and an indicator for the second key definition function.

10. The network device of claim 9, wherein the PFS procedure includes a Diffie-Hellman key exchange procedure that generates the secret key.

11. The network device of claim 9, wherein the first secondary key in the plurality of secondary keys is assigned for communications between the serving network and the piece of user equipment and the second secondary key in the plurality of secondary keys is assigned for communications between the home network and the piece of user equipment.

12. The network device of claim 9, wherein the access and mobility management function, when executed by the set of one or more processors further causes the switch to transmit an authentication request to the home network for the piece of user equipment, wherein the PFS indicator and authentication information are received from the home network in response to the authentication request, wherein the PFS indicator and the authentication information are included in the same message transmitted from the home network.

13. A non-transitory machine-readable medium having computer code stored therein, which when executed by a set of one or more processors of a network device functioning as a switch in a serving network, causes operations to selectively employ perfect forward security (PFS) based on an indication from a home network, the operations comprising:

receiving a PFS indicator from the home network, the PFS indicator is set by the home network based on a subscription level of the user of a piece of user equipment and capabilities of the piece of user equipment;

determining whether the PFS indicator indicates that the home network has instructed the serving network to employ PFS for communications with the piece of user equipment;

performing a PFS procedure with the piece of user equipment in response to determining that the PFS indicator indicates that the home network has instructed the serving network to employ PFS for communications with the piece of user equipment, wherein a secret key is generated in the PFS procedure between the serving network and the piece of user equipment, and wherein the home network communicates with the piece of user equipment based on the secret key generated in the PFS procedure;

transmitting, by the serving network to the home network, one or more keys in a set of secret keys, the set of secret keys includes the secret key and keys generated using the secret key;

generating, by the serving network, a plurality of secondary keys based on the secret key, a first secondary key in the plurality of secondary keys is generated using a first key definition function that takes the secret key and a first value as inputs, a second secondary key in the plurality of secondary keys is generated using the first key definition function that takes the secret key and a second value as inputs, and the plurality of secondary keys are included in the set of secret keys;

generating, by the serving network, one or more tertiary keys based on the plurality of secondary keys, the one or more tertiary keys are included in the set of secret keys, a first tertiary key in the one or more tertiary keys is generated using a second key definition function that takes the secret key as an input, and the first tertiary key is used for a specified type of communications with the piece of user equipment;

the specified type of communications is one of Non-Access Stratum (NAS) protocol communications and Packet Data Convergence Protocol (PDCP) communications; and receiving, by the serving network, a key generation information together with the PFS indicator, including one or more of the first value, the second value, an indicator for the first key definition function, and an indicator for the second key definition function.

\* \* \* \* \*